Figure 1:
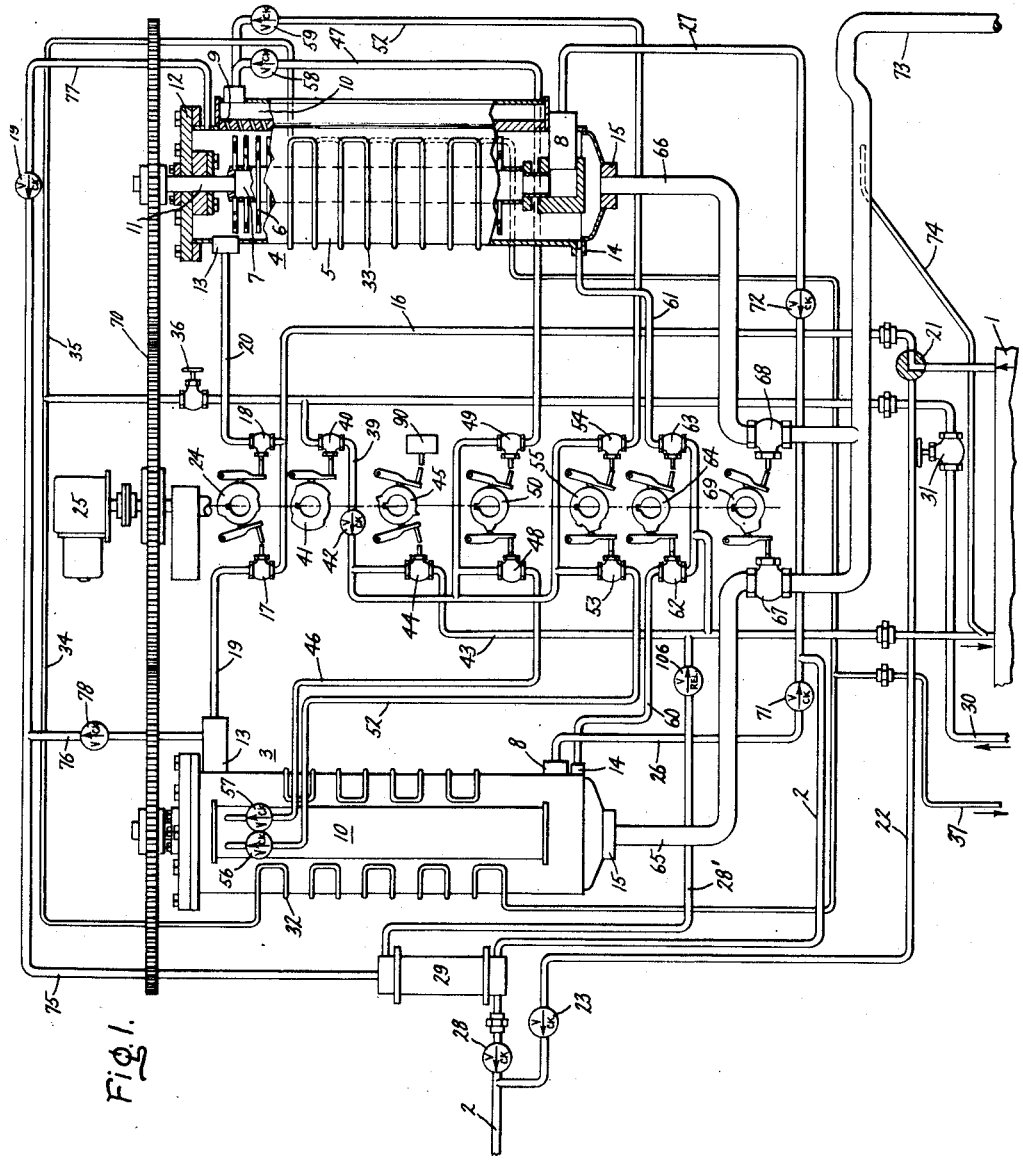

Oct. 27, 1953  J. J. PRENDERGAST  2,656,927
FLUID SUPPLY SYSTEM
Filed Oct. 26, 1950  2 Sheets-Sheet 1

Inventor:
James J. Prendergast,
by Ernest C. Britton
His Attorney.

Oct. 27, 1953    J. J. PRENDERGAST    2,656,927
FLUID SUPPLY SYSTEM
Filed Oct. 26, 1950    2 Sheets-Sheet 2

Inventor:
James J. Prendergast,
by Ernest C. Britton
His Attorney.

Patented Oct. 27, 1953

2,656,927

UNITED STATES PATENT OFFICE 2,656,927

FLUID SUPPLY SYSTEM

James J. Prendergast, Erie, Pa., assignor to General Electric Company, a corporation of New York Application October 26, 1950, Serial No. 192,320

4 Claims. (Cl. 210—152)

This invention relates to fluid supply systems and more particularly to filtering arrangements for such systems. More specifically, this inventions is particularly concerned with a fuel filtering unit for fluid fuel combustion apparatus.

Fluid fuel combustion apparatus utilizing commercial grades of fuel oil is commonly protected from foreign matter in the fuel by screens arranged in the fuel supply lines. In the case of a gas turbine, however, particularly when utilized as a prime mover in a locomotive, the combustion accessories require a degree of fuel purification sufficient to protect the various components from excessive wear and also to prevent clogging of the fuel nozzles. This purity requirement limits the screen mesh to that which will arrest particles in the fuel oil larger than .001 inch. If the filtered solids were allowed to accumulate on a screen which will arrest particles of this size, the flow of fuel of the type commercially available would be quickly stopped. In the case of a locomotive utilizing a gas turbine prime mover, it is, of course, essential that constant flow of fuel to the gas turbine be maintained. It is therefore desirable in the design of fuel supply systems of this type to provide a duplex filtering unit so that one filter may be connected in the fuel line while the other is being cleaned. It is also desirable to provide for automatic change-over from one filter element to the other prior to the time that the filter in use becomes sufficiently clogged to stop the flow of fuel.

An object of this invention is to provide an improved fluid supply system.

Another object of this invention is to provide an improved filtering arrangement for a fluid supply system.

A further object of this invention is to provide an improved duplex filtering arrangement for a fluid supply system incorporating automatic change-over from one filter element to the other with provision for cleaning the filter which is disconnected from the line.

A still further object of this invention is to provide an improved duplex filtering arrangement for a fluid supply system wherein automatic change-over from one filter to the other is provided together with cleaning of the filter disconnected from the line responsive to a predetermined fluid pressure drop across the filter in use.

Further objects and advantages of this invention will become apparent and the invention will be better understood by reference to the following dscription and the accompanying drawings, and the features of novelty which characterize this invention will be pointed out with particularity in the claims annexed to and forming a part of this specification.

In accordance with this invention, a pair of filters are provided with means for selectively connecting the filters in the line and for selectively cleaning the filters to remove accumulated foreign matter therefrom. One of the filters is normally connected in the fluid supply line while the other filter is connected for cleaning. Means are provided for reversing the connection of the filters so that the second filter is connected in the line and the first is connected for cleaning responsive to a predetermined fluid pressure drop across the filter in line. This arrangement provides automatic reversal of the filter connections so that one filter is in use while the other is being cleaned.

Figure 2:
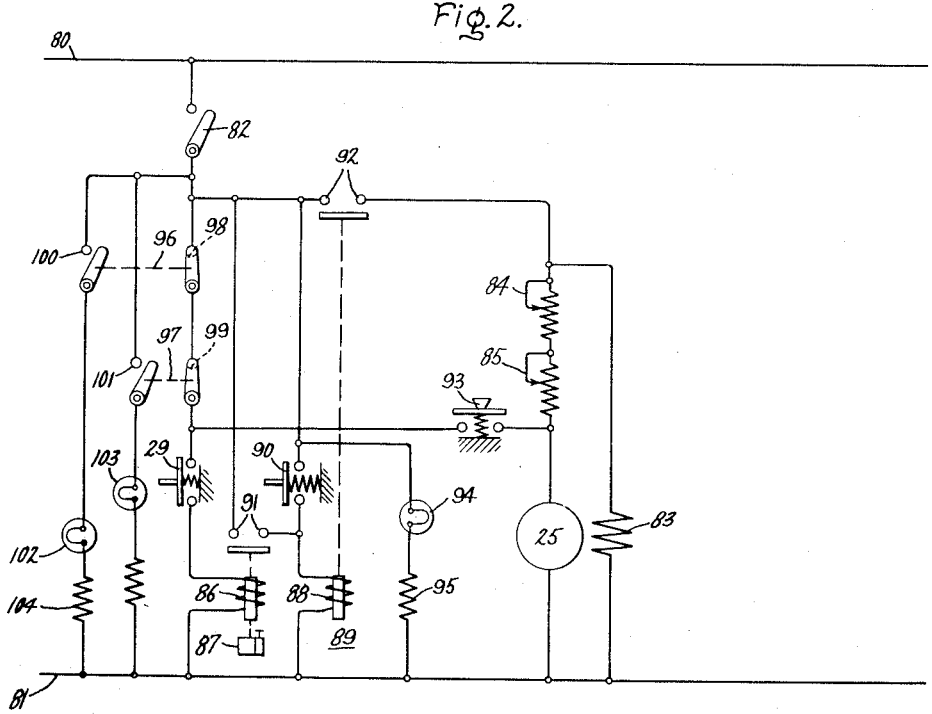

In the drawings Fig. 1 is a diagrammatic illustration of the improved filtering arrangement of this invention; and Fig. 2 is a schematic view of the control circuit of the improved filtering arrangement of Fig. 1.

Referring now to Fig. 1, there is shown a fuel supply tank 1 which supplies fuel to combustion apparatus (not shown) through fuel supply line 2. In order to filter the foreign matter from the fuel, a pair of filter units 3 and 4 are provided. These filter units are more fully described in my copending application Serial No. 130,245, filed November 30, 1949, assigned to the assignee of the present application. Referring to filter 4, each filter comprises a chamber member 5 in which a plurality of screen filter elements 6 are arranged. The filter elements 6 communicate with the interior of a hollow supporting member 7 which in turn communicates with fuel outlet 8. In order to clean the filter elements 6 to remove the accumulation of foreign matter therefrom, a plurality of jets of cleansing medium, such as steam, are directed onto the surfaces of the filter elements by means of nozzles 9 formed in a wall of the chamber 5 and communicating with a chest 10. In order to insure that the cleansing medium introduced by the nozzles 9 into the chamber 5 impinges uniformly on all surfaces of the filter elements 6, the filter elements and supporting assembly are arranged to be rotated by means of a shaft 11 journalled in suitable bearings in the cover 12. The fuel to be filtered is introduced in the top of the chamber 5 by means of fuel inlet 13 and, as described above, the filterd fuel is discharged through fuel outlet 8. In order to clean the filter elements, the fuel in the chamber 5 must be removed and therefore a fuel drain 14 is provided. The foreign matter removed from the filter elements by the jets of cleansing medium is removed from the chamber 5 through blow-down opening 15 arranged in the bottom of the chamber 5.

In order to connect the filter units 3 and 4 in the fuel supply line 2, the arrangement now to be described is provided. Fuel is taken from the supply tank 1 through a line 16 in which valves 17 and 18 are arranged. Valve 17 is connected to the fuel inlet of filter unit 3 by means of line 19 and valve 18 is connected to the fuel inlet of filter unit 4 by means of line 20. A three-way cock 21 is arranged in the line 16 and a by-pass line 22 connects the cock 21 and the fuel supply line 2 to provide for by-passing fuel around the duplex filter unit. Check valve 23 is arranged in the by-pass line 22. The valves 17 and 18 therefore provide for selectively connecting either the filter unit 3 or the filter unit 4 in the fuel supply line 2. Valves 17 and 18 are arranged for operation by a cam 24 which is driven by drive motor 25, as will be hereinafter described. Lines 26 and 27 are respectively connected to the fuel discharge openings of filter units 3 and 4 and serve to connect the fuel discharge openings to the fuel supply line 2. A check valve 28 is arranged in the fuel supply line 2 and one side of differential pressure responsive switch 29 is also arranged in the fuel supply line 2, as will be hereinafter described.

The cleansing medium, hereinafter referred to as steam is provided for cleaning the filter elements of the filter units 3 and 4 and for heating the filter units through a steam supply line 30 in which a main manually controlled valve 31 is arranged. Heating coils 32 and 33 are respectively arranged around the chambers of the filter units 3 and 4 and are connected to the steam supply line 30 through lines 34 and 35 and valve 36. Condensate from the heating coils 32 and 33 is discharged through line 37. In order to supply steam to the nozzle chests 10 of filter units 3 and 4, line 39 is connected to the main steam supply line 30 and the main steam valve 40 is arranged therein for operation by cam 41. Check valve 42 is also arranged in the line 39. A steam drain line 43 connects the line 39 back to the tank 1 and a steam line drain valve 44 is arranged therein for operation by the cam 45. Two steam lines are provided to each nozzle chest of the filter units 3 and 4. Lines 46 and 47 respectively connect the steam line 39 to the nozzle chests through nozzle chest valves 48 and 49 which are arranged for operation by cam 50. Lines 51 and 52 likewise connect the steam line 39 to the nozzle chest of the two filter units through nozzle chest valves 53 and 54 which are arranged for operation by cam 55. Check valves 56 and 57 are respectively arranged in lines 52 and 46 and check valves 58 and 59 are respectively arranged in lines 47 and 52.

Fuel drain lines 60 and 61 connect the fuel drain openings of the filter units 3 and 4 to the drain line 43 through valves 62 and 63 which are arranged for operation by cam 64. The accumulated foreign matter which is cleaned from the filter elements by the steam jets is blown through blowdown lines 65 and 66 in which blowdown valves 67 and 68 are respectively arranged. These valves are arranged for operation by cam 69. The cams 24, 41, 45, 50, 55, 64 and 69 are operated by drive motor 25 and control the sequence of operations of the valves described above, in the manner to be hereinafter described. Drive motor 25 also rotates the filter elements 6 of the filter units 3 and 4 through gearing 70. Fuel discharge lines 26 and 27 are provided respectively with check valves 71 and 72. The blowdown lines 65 and 66 terminate in a common blowdown line 73 which may lead to a blowdown collection tank mounted on the locomotive (not shown). An oil return line 74 connects the blowdown line 73 and the drain line 43.

In order to provide for reversing the filter connections, as will be hereinafter described, a differential pressure switch 29 is provided having one end connected in the fuel supply line 2 and its other end connected to the inlet sides of the filter units 3 and 4 by means of line 75 from which line 76 branches to filter unit 3 and line 77 to filter unit 4. Check valves 78 and 79 are respectively arranged in lines 76 and 77. It will therefore be readily apparent that the differential pressure switch 29 senses the difference in pressure between the fuel inlet and the fuel outlet of the filter unit being utilized. The differential pressure switch 29 is set to operate at a predetermined pressure drop across the filter unit being used in order to perform a control function, as described below. Drain line 28' connects the pressure switch 29 to drain line 43 and a relief valve 106 is arranged therein.

Referring now to Fig. 2, there is shown a control circuit for the filter assembly of Fig. 1 in which motor 25, which may be a conventional shunt wound D. C. motor, is arranged for energization from a source of direct current from lines 80 and 81. The main line switch 82 is provided in series with the motor circuit and shunt field 83 is connected across the motor armature. Armature resistances 84 and 85 are arranged in series with the armature. The contacts of the differential pressure switch 29 are arranged across the motor armature and the coil 86 of the time delay relay 87 is arranged in series therewith. Coil 88 of relay 89 is also arranged across the motor armature with the contacts of the limit switch 90 arranged in series therewith. Reference to Fig. 1 will indicate that limit switch 90 is operated by cam 45. Contacts 91 of relay 87 are arranged across the contacts of limit switch 90 and contacts 92 of relay 89 are arranged in series with the motor circuit. Push button 93 is connected across contacts 92 in order to provide for manual control of the motor 25. Pilot light 94 and series resistor 95 are connected across the line to indicate breaker is closed and circuit is energized. During operation of the locomotive, it may become desirable to forestall automatic transfer of the filters, as will be described hereinafter, and therefore switches 96 and 97 are provided in both cabs in order to deenergize the motor circuit. Contacts 98 and 99 of switches 96 and 97 are arranged in series with the differential pressure switch contacts 29 while contacts 100 and 101 are respectively arranged in series with pilot lights 102 and 103 with the associated series resistances 104 and 105. The pilot lights 102 and 103 indicate to the locomotive crew that the filter unit is not on automatic operation.

In operation, at the beginning of a normal cycle, it is assumed that filter unit 3 is connected in the fuel supply line 2 and that filter unit 4 is in the process of being cleaned. Therefore, valve 17 will be open and valve 18 closed in order to connect filter unit 3 in the fuel supply system and to disconnect filter unit 4. Disregarding the cleaning cycle taking place in filter unit 4, nozzle chest valves 48 and 53, drain valve 62, and blowdown valve 67 will be closed. Fuel is therefore flowing from the tank 1 through three-way cock 21, line 16, valve 17, line 19, the filter 3, line 26, and fuel supply line 2. With line switch 82 and contacts 98 and 99 of cab switches 96 and 97 closed, the differential pressure switch 29 will operate to close its contacts when a predetermined pressure drop across the filter 3 is reached due to the accumulation of filtered foreign matter on the filter elements. This energizes coil 86 of time delay relay 87; however, the contacts do not close until a predetermined short period of time has passed in order to prevent false operation due to momentary pressure variations. When the relay 87 has picked up closing contacts 91, coil 88 of relay 89 is energized closing contacts 92 to start the motor 25. Drive motor 25 is thus energized from lines 80 and 81 and thus starts to rotate the cams 24, 41, 45, 50, 55, 64 and 69 to produce the following preferred cycle of changeover and cleaning. First, the steam line drain valve 44 is closed by cam 45 and the contacts of the limit switch 90 are closed, thus shorting out the time delay relay contacts 91, thus nullifying the effect of contacts 91 during the remainder of the cycle as hereinafter explained. The fuel inlet valve 18 to the clean filter 4 is then cracked open by the cam 24 for a brief length of time to allow the cleaned filter to fill with fuel. Further rotation of the cam 24 opens the fuel inlet valve 18 fully and concurrently closes the fuel inlet valve 17 of the congested filter 3. The changeover of the filter elements is complete at this point in the cycle with filter 3 removed from the line and filter 4 passing fuel to the fuel supply line 2. The main steam valve 40 is next opened by the cam 41 and the fuel drain valve 62 of the congested filter 3 is opened by the cam 64 in order to drain the fuel from the chamber of the filter back to the main fuel tank 1. The nozzle chest valves 48 and 53 are next cracked open by cams 50 and 55 in order to force oil from the filter chamber of filter 3 to the drain line 60 and thus to the main fuel tank 1. The nozzle chest valves 48 and 53 are then closed and the fuel drain valve 62 is closed. The blowdown valve 67 is then opened by cam 69 which allows the sludge from the chamber of filter 3 to be blown from the filter body through the blowdown line 65 and 73 into the blowdown tank. Nozzle chest valve 48 is next opened in order to admit high pressure steam to the nozzle chest supplying jets of steam through the nozzles 9 to impinge on one side of the filter elements 6. The nozzle chest valve 48 is then closed and simultaneously the nozzle chest valve 53 is opened to impinge steam on the other sides of the filter elements. During the above enumerated sequence of operation, the drive motor 25 is, of course, rotating the filter element 6 of the congested filter 3 by means of gears 70. The nozzle chest valve 53 is then closed and the main steam valve 40 and blowdown valve 67 are also closed. The steam line drain valve 44 is then opened and the limit switch is opened breaking the motor drive circuit and ending the cycle. It will be noted that as soon as the clean filter 4 was placed on the line, the pressure drop across the filter dropped below the predetermined level so that the contacts of pressure switch 29 were opened, thus opening contacts 91 of time delay relay 87. However, at this point, the limit switch 90 had closed, short circuiting the contacts 91 and permitting the continued operation of the drive motor 25. At the end of one changeover and cleaning cycle, as just described, the cams 24, 41, 45, 50, 55, 64, 69 have completed one-half revolution and the system is now ready to complete another changeover and cleaning cycle when the filter unit 4 becomes sufficiently congested so that the pressure drop as sensed by the differential pressure switch 29 reaches the predetermined value.

While the preferred sequence of the operation of the various valves has been described, it will be readily apparent that this sequence may be modified to produce the same result. Basically, one filter is in the fuel supply line while the other is being cleaned and the filter connections are reversed responsive to a predetermined pressure drop across the filter in use caused by the accumulation of foreign matter formed thereon. It will be readily apparent that switch 96 or 97 may be operated in either cab of the locomotive to open contacts 98 or 99 in order to render the automatic changeover circuit ineffective. In this case, contacts 100 or 101 will be closed to illuminate pilot lights 102 or 103 to indicate that the filter is not in automatic operation. Push button 93 may be operated to run the drive motor 25 at any time regardless of the particular point in the automatic changeover cycle.

It will now be readily apparent that this invention provides an improved duplex filter arrangement wherein one filter is in use while the other is being cleaned and wherein the filter connections are automatically reversed in order to maintain a constant flow of fluid. It will be readily understood that filters differing in construction from those shown may be utilized and that control devices for initiating the various phases of the changeover and cleaning sequence may also differ from those shown without departing from this invention.

While I have shown and described a specific embodiment of this invention, further modifications and improvements will occur to those skilled in the art. I desire it to be understood, therefore, that this invention is not limited to the specific embodiments shown, and I intend in the appended claims to cover all modifications which do not depart from the spirit and scope of this invention.

What I claim as new and desire to be secured by Letters Patent of the United States is:

1. In a fluid supply system, a fluid supply line, a pair of filters for removing foreign matter from said fluid, a pair of valves arranged to selectively connect said filters in said line, each of said filters having means for introducing a cleansing medium therein for removing accumulated foreign matter, a pair of valves arranged to selectively connect said cleansing medium introducing means to a source of cleansing medium, each of said filters having a drain line for draining fluid therefrom with a pair of valves respectively arranged therein for selectively opening and closing the same, each of said filters having a discharge line for discharging foreign matter therefrom with a pair of valves respectively arranged therein for selectively opening and closing the same, one of said filters being normally connected in said fluid supply line while the other of said filters is connected for draining, a plurality of cams respectively arranged to operate each of said pairs of valves in a predetermined sequence to reverse the connections of said filters so that said one filter is connected for cleaning and said other filter is connected in said fluid supply line, a drive motor connected to operate said cams, and a differential pressure responsive switch connected across the output of said fluid supply line and the fluid input of each of said filters for sensing the fluid pressure drop across the filter connected in said fluid supply line, said switch being connected in the circuit of said motor and arranged to energize the same responsive to a predetermined fluid pressure drop across the filter connected in said fluid supply line whereby said motor operates said cams to automatically remove a congested filter from said fluid supply line and to clean the same and to connect the filter cleaned in the last cycle in said fluid supply line.

2. In a fluid supply system, a fluid supply line, a pair of filters for removing foreign matter from said fluid, a pair of valves arranged to selectively connect said filter in said line, each of said filters having rotatable filter elements therein and means for introducing a cleansing medium therein for removing accumulated foreign matter from said elements, a pair of valves arranged to selectively connect said cleansing medium introducing means to a source of cleansing medium, each of said filters having a drain line for draining fluid therefrom with a pair of valves respectively arranged therein for selectively opening and closing the same, each of said filters having a discharge line for discharging foreign matter therefrom with a pair of valves respectively arranged therein for selectively opening and closing the same, one of said filters being normally connected in said fluid supply line while the other of said filters is connected for cleaning, a plurality of cams respectively arranged to operate each of said pairs of valves in a predetermined sequence to reverse the connections of said filters so that said one filter is connected for cleaning and said other filter is connected in said fluid supply line, a drive motor connected to operate said cams and to rotate said filter elements, and a differential pressure responsive switch connected across the output of said fluid supply line and the fluid input of each of said filters for sensing the fluid pressure drop across the filter connected in said fluid supply line, said switch being connected in the circuit of said motor and arranged to energize the same responsive to a predetermined fluid pressure drop across the filter connected in said fluid supply line whereby said motor operates said cams to automatically remove a congested filter from said fluid supply line and to clean the same and to connect the filter cleaned in the last cycle in said fluid supply line.

3. In a fluid supply system, a fluid supply line, a pair of filters for removing foreign matter from said fluid, a pair of valves arranged to selectively connect said filters in said line, each of said filters having filter elements therein, each of said filters having first means for directing a stream of cleansing medium onto one side of said filter elements and second means for directing a stream of cleansing medium onto the other side of said filter elements for removing the accumulated foreign matter therefrom, a cleansing medium supply line connected to a source of cleansing medium, a single valve arranged in said last-mentioned line for opening and closing the same, a pair of valves arranged to selectively connect said last-named supply line to said first directing means and another pair of valves arranged to selectively connect said last-named supply line to said second directing means, each of said filters having a drain line for draining fluid therefrom with a pair of valves respectively arranged therein for selectively opening and closing the same, each of said filters having a discharge line for discharging foreign matter therefrom with a pair of valves respectively arranged therein for selectively opening and closing the same, one of said filters being normally connected in said fluid supply line while the other of said filters is connected for cleaning, a plurality of cams arranged to operate each of said pairs of valves and said single valve in a predetermined sequence to reverse the connections of said filters so that said one filter is connected for cleaning and said other filter is connected in said fluid supply line, a drive motor connected to operate said cams, and a differential pressure responsive switch connected across the output of said fluid supply line and the fluid input of each of said filters for sensing the fluid pressure drop across the filter connected in said fluid supply line, said switch being connected in the circuit of said motor and arranged to energize the same responsive to a predetermined fluid pressure drop across the filter connected in said fluid supply line whereby said motor operates said cams to automatically remove a congested filter from said fluid supply line and to clean the same and to connect the filter cleaned in the last cycle in said fluid supply line.

4. In a fluid supply system, a fluid supply line, a pair of filters for removing foreign matter from said fluid, a pair of valves arranged to selectively connect said filter in said line, each of said filters having means for introducing a cleansing medium therein for removing accumulated foreign matter therefrom, a limit switch, a pair of valves arranged to selectively connect said cleansing medium introducing means to a source of cleansing medium, each of said filters having a drain line for draining fluid therefrom with a pair of valves respectively arranged therein for selectively opening and closing the same, each of said filters having a discharge line for discharging foreign matter therefrom with a pair of valves respectively arranged therein for selectively opening and closing the same, one of said filters being normally connected in said fluid supply line while the other of said filters is connected for draining, a plurality of cams respectively arranged to operate each of said pairs of valves and said limit switch in a predetermined sequence to reverse the connections of said filter so that said one filter is connected for cleaning and said other filter is connected in said fluid supply line, a drive motor connected to operate said cams, and a differential pressure responsive switch connected across the output of said fluid supply line and the fluid input of each of said filters for sensing the fluid pressure drop across the filter connected in said fluid supply line, said switch being connected in the circuit of said motor and arranged to energize the same responsive to a predetermined fluid pressure drop across the filter connected in said fluid supply line whereby said motor operates said cams to automatically remove a congested filter from said fluid supply line and to clean the same and to connect the filter cleaned in the last cycle in said fluid supply line, said limit switch being connected in the circuit of said motor to de-energize the same on completion of one filter change-over cycle.

JAMES J. PRENDERGAST.

References Cited in the file of this patent

UNITED STATES PATENTS

| Number | Name | Date |
| --- | --- | --- |
| 1,841,340 | Stelfox | Jan. 12, 1932 |
| 1,883,805 | Martin et al. | Oct. 18, 1932 |
| 2,066,479 | MacIsaac | Jan. 5, 1937 |
| 2,183,075 | Hughes | Dec. 12, 1939 |
| 2,355,455 | McPhilomy | Aug. 8, 1944 |
| 2,451,073 | Cowherd | Oct. 12, 1948 |
| 2,454,124 | Birsch et al. | Nov. 16, 1948 |